United States Patent [19]

Traudt

[11] Patent Number: 4,632,637
[45] Date of Patent: Dec. 30, 1986

[54] WIND TURBINE

[75] Inventor: Ray F. Traudt, Englewood, Colo.

[73] Assignee: Analytics, Inc., Englewood, Colo.

[21] Appl. No.: 618,047

[22] Filed: Jun. 7, 1984

Related U.S. Application Data

[63] Continuation-in-part of Ser. No. 270,221, Jun. 4, 1981, abandoned.

[51] Int. Cl.⁴ .............................................. F03D 7/04
[52] U.S. Cl. ........................................ 416/41; 416/11; 416/51; 416/141
[58] Field of Search .......... 416/32, 43 A, 23, DIG. 7, 416/44 A, 11, 175 A, 41 A, 50 A, 51 A, 52 A, 151, 152, 132 B, 142 B, 141

[56] References Cited

U.S. PATENT DOCUMENTS

| Re. 8,235 | 5/1878 | Palmer | 416/135 A X |
|---|---|---|---|
| 612,464 | 10/1898 | Stewart | 416/138 R X |
| 2,054,383 | 9/1936 | Ludewig | 416/135 A |
| 2,094,941 | 10/1937 | Burkhartsmeier | 416/132 B X |
| 2,516,576 | 7/1950 | Jacobs | 416/135 A |
| 2,533,785 | 12/1950 | Fumagalli | 416/139 A X |
| 4,310,284 | 1/1982 | Randolph | 416/132 B |

FOREIGN PATENT DOCUMENTS

| 647287 | 7/1937 | Fed. Rep. of Germany | 416/142 B |
|---|---|---|---|
| 729180 | 12/1942 | Fed. Rep. of Germany | 416/142 B |
| 2546884 | 4/1977 | Fed. Rep. of Germany | 416/132 B |
| 2739297 | 3/1978 | Fed. Rep. of Germany | 416/11 |
| 2944718 | 5/1981 | Fed. Rep. of Germany | 416/132 B |
| 868278 | 12/1941 | France | 416/135 A |
| 908631 | 4/1946 | France | 416/141 A |
| 988883 | 9/1951 | France | 416/135 A |
| 2401331 | 4/1979 | France | 416/44 A |
| 148978 | 11/1980 | Japan | 416/132 B |

Primary Examiner—Everette A. Powell, Jr.

[57] ABSTRACT

A high speed, downwind horizontal axis wind turbine includes three circumferentially spaced lightweight blades having inner support arms and radially outwardly disposed airfoil configured blade segments which are pivotally connected to the support arms, so as to fold straight downwind under high wind conditions or high rotating speeds. A spring biased control mechanism serves to rotate the airfoil segment of each blade about its longitudinal axis as the blade is folded downwind, so that a simultaneous folding and feathering action is obtained to prevent damage to the turbine in high wind conditions or under high rotating speeds.

15 Claims, 17 Drawing Figures

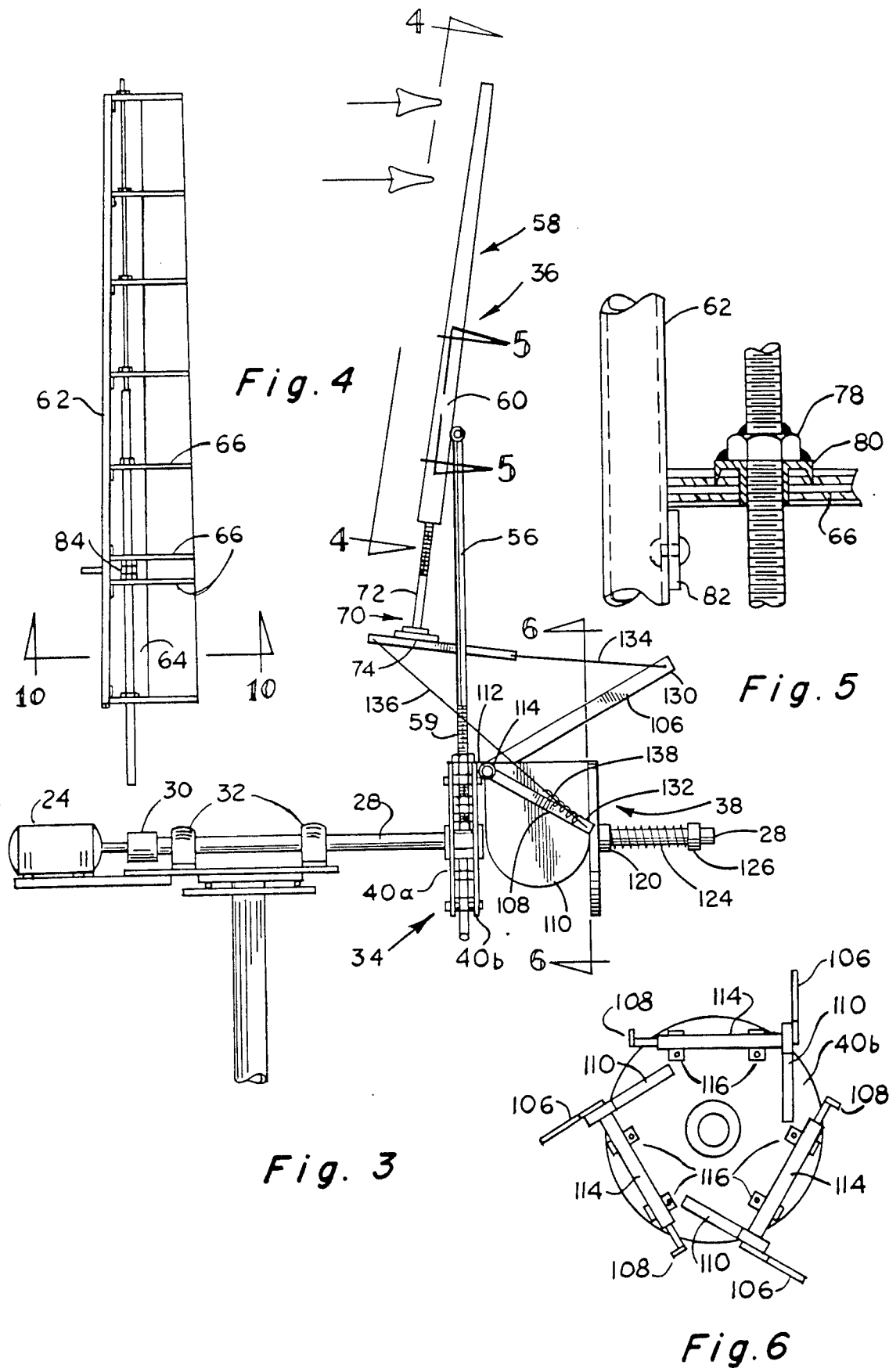

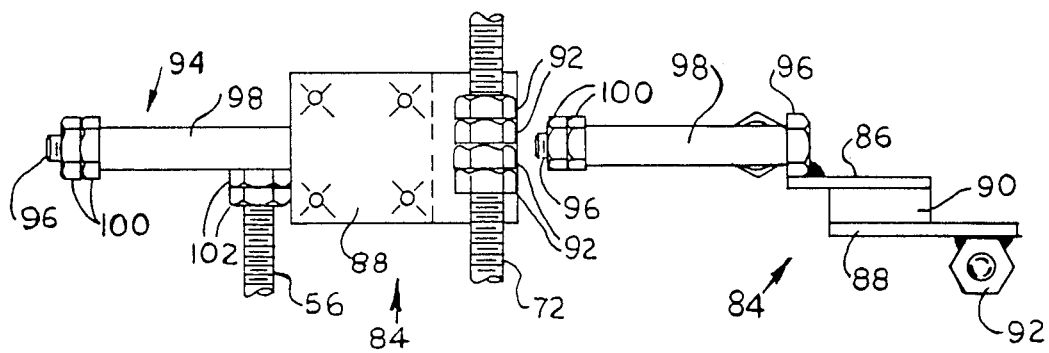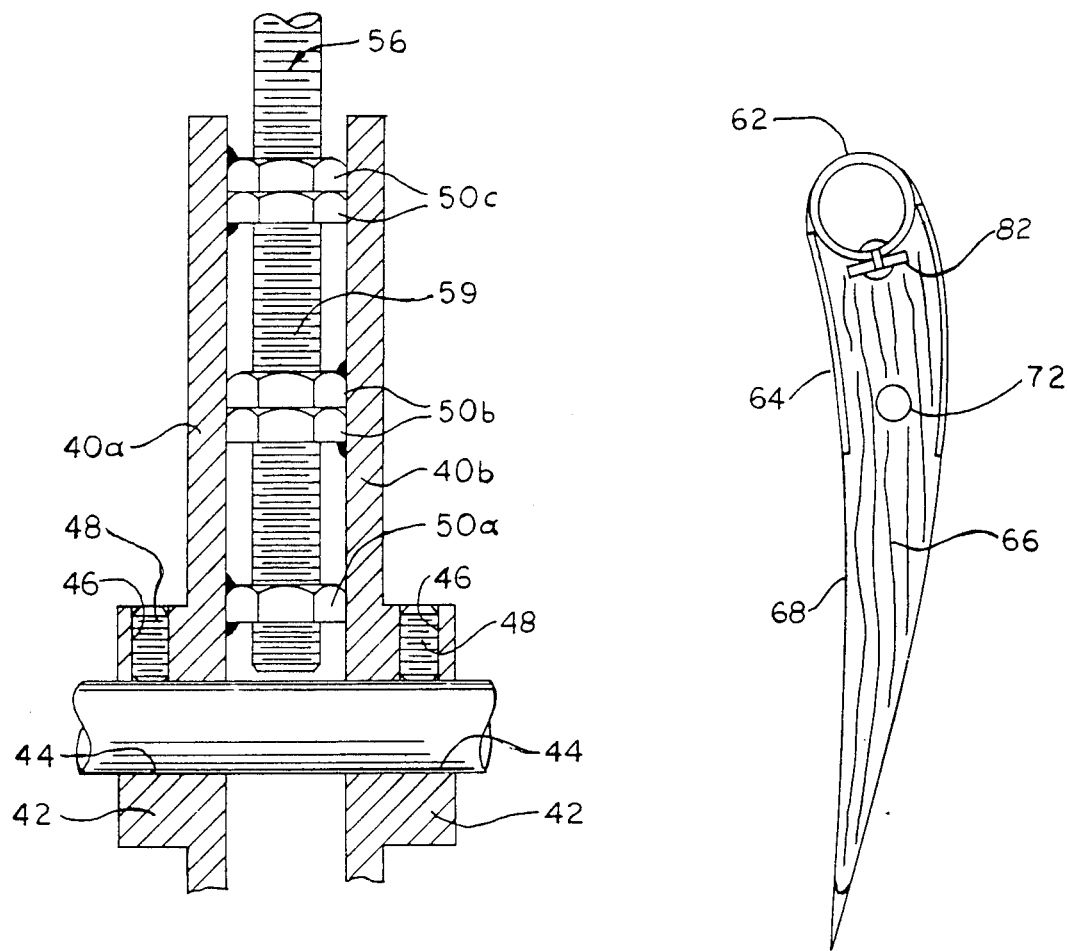

| WIND | WIND VELOCITY (MPH) | CONTROL ARM TILT (DEGREES) RELATIVE TO HORIZONTAL | BLADE FOLD (DEGREES) RELATIVE TO VERTICAL | ANGLE OF BLADE RELATIVE TO A LINE PERPENDICULAR TO WIND DIRECTION |
|---|---|---|---|---|
| HIGH WIND | 100 | 36.3 | 35.8 | 80.4 |
| | 80 | 36 | 35.6 | 80 |
| | 60 | 35.5 | 35.3 | 79.4 |
| NORMAL WIND | 40 | -21.9 | 8.2 | 12.6 |
| | 30 | -25.1 | 7.2 | 8.4 |
| | 25 | -26.3 | 6.6 | 6.2 |
| | 20 | -27.6 | 6.3 | 3.7 |
| | 15 | -29.6 | 5.6 | 0 |
| | 10 | -29.9 | 5.4 | -.6 |
| | 5 | -29.9 | 5.4 | -.6 |
| | 0 | -30 | -2 | 20.5 |

WIND TURBINE

RELATED APPLICATION

This is a Continuation-In-Part application of my previously filed U.S. application Ser. No. 270,221 filed June 4, 1981 for Wind Turbine now abandoned

BACKGROUND OF THE DISCLOSURE

The present invention relates generally to wind turbines and, more particularly, to a wind turbine having blades which simultaneously, and under naturally occurring forces, fold straight downwind and feather to prevent damage to the turbine.

Wind turbines have been used for years in an attempt to capture the energy carried by moving air, with some turbines being designed for low speed, but high torque, operation, such as to operate pumps, and others operated at high speed and less torque, which are typically utilized to operate electric generators, or the like.

Wind turbines may be mounted on vertical or horizontal axes, with the horizontal axis turbines normally being designed so that the rotational axis lies in an up-/down wind direction, and is freely rotatably mounted about a vertical axis to automatically maintain this orientation. Some horizontal axis turbines have the blades mounted on the upwind end of the rotational axis, while others have the blades mounted on the downwind end of the axis. The turbines having the blades on the upwind end normally utilize a simple tail vane or some other special equipment to keep the blades oriented into the wind. The downwind blade turbines normally utilize the wind forces themselves to maintain a correct orientation of the turbine relative to the wind.

The movement of a blade across the path of an airstream creates the effect of a relative wind blowing on the blade from the direction in which the blade travels. This relative wind, at least in high speed turbines, is normally much higher in velocity than the speed of the moving air mass through which the blade moves, and combines with the original wind velocity perpendicular to it, to result in an apparent wind on the blade.

Power which can be extracted from moving air varies with the cube of the velocity of the wind. For good efficiency, two-thirds of the wind velocity is converted to turbine rotation energy, and the remaining one third is left to continue transport of the air to avoid stagnation.

Pressures on the blade surface vary as the square of the wind speed. These pressures are higher on the upwind side of the blade, and lower on the downwind side. The resultant force typically acts through a point approximately one quarter of the distance back from the leading edge of the blade toward the trailing edge, and acts in a direction fairly perpendicular to the blade surface, largely in the downwind direction, but partially in the direction of rotation.

The resultant aerodynamic or wind force on a blade can be considered to be constituted of a lift force perpendicular to the apparent wind direction, and a smaller drag force along the apparent wind direction.

The resultant force can also be considered to be separated into a large force which acts in the direction of the main axis of the turbine, and a small force acting perpendicular to it in the direction the blade rotates. This latter force is a component which, with the movement of the blade, represents the converted energy of the turbine.

It can be seen from the above that energy capture potential of a turbine varies with the square of the diameter of interception area of the blade, with the cube of wind velocity, and, also, with air density, and humidity, which have not been mentioned. A well designed blade profile and pitch schedule are important to the efficiency of a wind turbine.

For high speed wind turbines, two, three, or four blades are normally used. Two blades are normally slightly more efficient, but produce problems with dynamics. Four blades are less efficient and more expensive, leaving a three blade configuration to be probably the best alternative for most mid-sized wind turbines.

Probably the biggest concern with high speed wind turbines is the survivability of the turbine, i.e., its ability to withstand high wind velocities and turbulence. In attempts to improve the survivability of a high speed wind turbine, mechanical arrangements have been made to turn and tilt the blades to keep them from rotating too fast. Many of these systems have been overly complex, and are detrimental not only from an economic standpoint, but, also, from a dependability standpoint. As will be appreciated, in order to improve survivability, the main objective is to limit rotor speed so as to avoid destructive levels of centrifugal forces and imbalance problems.

One system for improving survivability has been to build the system of very heavy and strong material, so that nothing can break at any speed. This philosophy is possibly alright for smaller machines, but cannot be economically employed on large machines, due to material bulk increasing faster than energy capture.

Another system for limiting rotor speed is to rotate the rotor assembly out of its normal position, bringing it sideways relative to the wind direction. If this is not done manually, or with a simple fantail spinner, then the complexity and cost of equipment to accomplish this rotation can be very large, with opportunity for malfunctioning increasing, and Exposure to cross winds which often occur in eddies in the strong winds.

Feathering the blades, i.e., rotating the blades about a longitudinal axis of the blade, has also been employed to limit rotor speed. While feathering is an effective protection, it normally has been done with blades that are left in their normally extended positions, perpendicular to their axis of rotation, where they develop large drag forces, which endanger the blades and the supporting tower.

Another procedure to limit rotor speed has been to fold the blades downwind as they are rotating. This is an excellent tactic for limiting the rotor speed, but the very large centrifugal forces normally acting on the blades tend to resist the folding of the blades, unless extraordinary force is applied to fold them, and due to conservation of momentum, the folding tends to increase rotating speeds.

It has also been proposed that the blades be feathered and then folded to control rotation speed, but the mechanical system for manipulating the blades in this manner is very complex, lending to excessive costs and dependability problems.

Brakes have also been used to slow turbines down in high wind conditions, but this approach may cause frequent power interruptions in normal operation.

To applicant's knowledge, no wind turbine has been developed which simultaneously folds the blades directly or straight downwind and feathers the blades to protect the turbine from high winds through natural forces and without use of auxiliary control equipment. It is to this end that the present invention has been developed.

SUMMARY OF THE INVENTION

The wind turbine of the present invention has been designed so that the blades will fold directly or straight downwind and simultaneously feather in wind conditions or rotational speeds above a predetermined level, and do so in a natural manner but at different rates, so that expensive and complicated mechanisms are not required, thereby minimizing expense, while maintaining maximum dependability.

The turbine incorporates an assembly which is fixed to a rotatable main shaft that may be connected operably to an electric generator, or the like, with the assembly including a plurality of radially directed blades and a control mechanism for yieldably retaining the blades in a generally radially extending orientation, but allowing the blades to fold straight downwind and feather simultaneously under predetermined wind conditions or rotational speeds.

Each blade of the assembly includes a radially inward support arm and a radially outward airfoil segment which is pivotally connected to the support arm so as to have the capability of folding downwind about the outer end of the support arm. The airfoil segment of each blade has a radially inward extension forming a counterbalance so that the effective center of gravity of the blade is located near the pivot connection to the support arm, but upwind therefrom, so that the outward airfoil segment of the blade is encouraged to fold downwind by the centrifugal forces acting on the blade and by the wind forces which act directly on the blade.

The control assembly for the blades, which is part of the turbine assembly, is operably connected to the inward extension of the airfoil segment of each blade, with the control assembly being adapted to rotate the airfoil segment of the blade about its longitudinal axis in response to downwind folding of the airfoil segment about its pivotal connection to the associated support arm. The folding movement of the airfoil segment is yieldingly resisted by a biasing means that is operatively acted upon by component parts of the control assembly.

By utilizing a system of the type to be described in more detail hereinafter, it will be appreciated that the blades themselves will simultaneously fold straight downwind and feather, but at a different rate, to prevent the turbine from rotating at speeds which would be a detriment to the survivability of the turbine.

Other objects, advantages, and capabilities of the present invention will become more apparent as the description proceeds, when taken in conjunction with the accompanying drawings.

BRIEF DESCRIPTION OF THE DRAWINGS

FIG. 3 is a fragmentary side elevation view of the turbine shown in FIG. 1, with parts removed for clarity.

FIG. 4 is a plan view of a portion of the turbine blade taken in the direction of the arrow 4—4 of FIG. 3.

FIG. 5 is an enlarged fragmentary section taken along line 5—5 of FIG. 3.

FIG. 6 is an enlarged section taken along line 6—6 of FIG. 3.

FIG. 7 is a plan view of the hinge bracket for pivotally connecting the component parts of each turbine blade.

FIG. 8 is a side elevational view of the hinge bracket shown in FIG. 7.

FIG. 9 is an enlarged fragmentary section illustrating the connection of each blade support arm to the main shaft of the turbine.

FIG. 10 is an enlarged section along line 10—10 of FIG. 4

DESCRIPTION OF THE PREFERRED EMBODIMENT

Figures 1, 2:
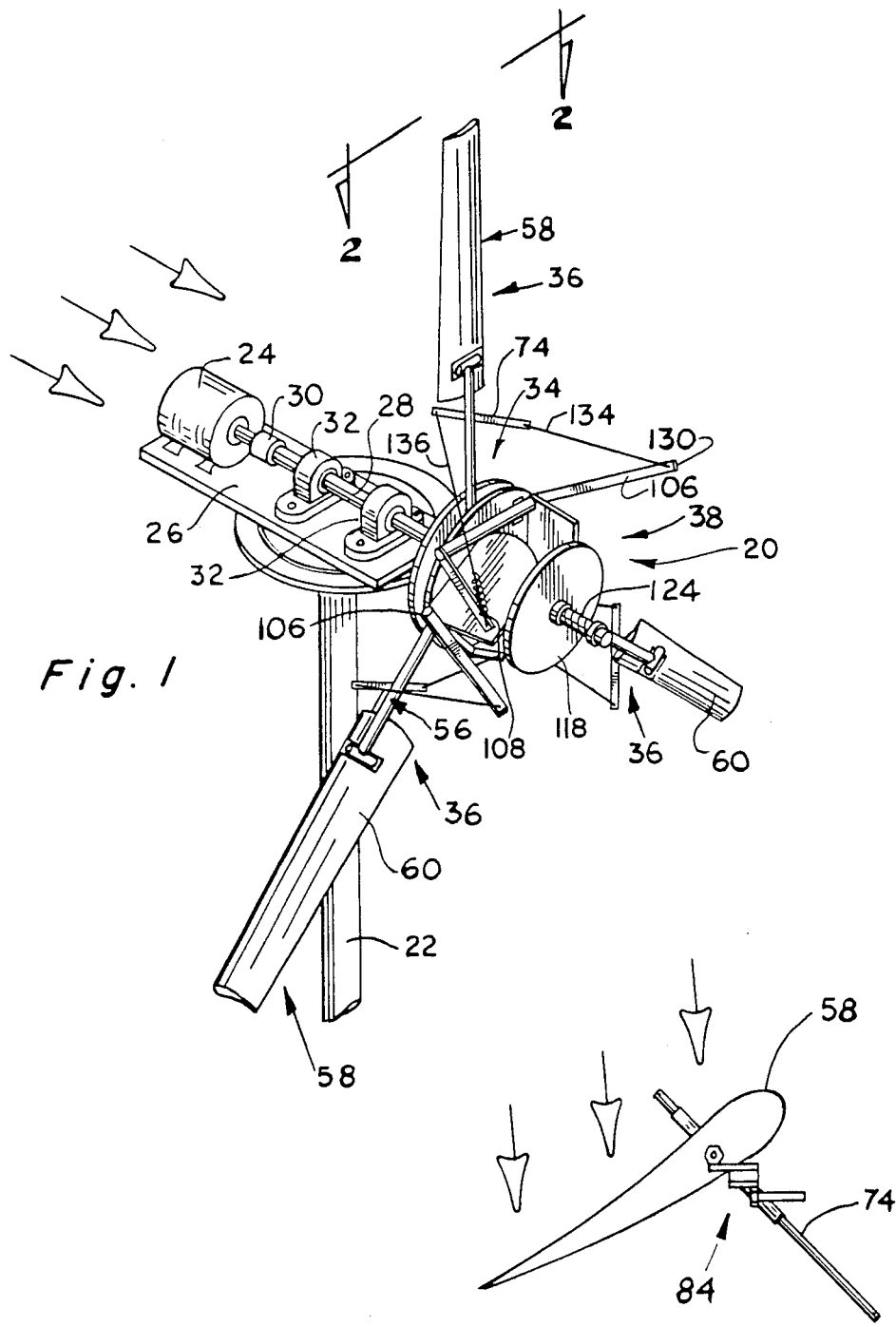
FIG. 1 is a perspective view of the wind turbine of the present invention mounted on a supporting tower.
FIG. 2 is an edge view of a blade taken in the direction of the arrows 2—2 of FIG. 1.
Figure 11:
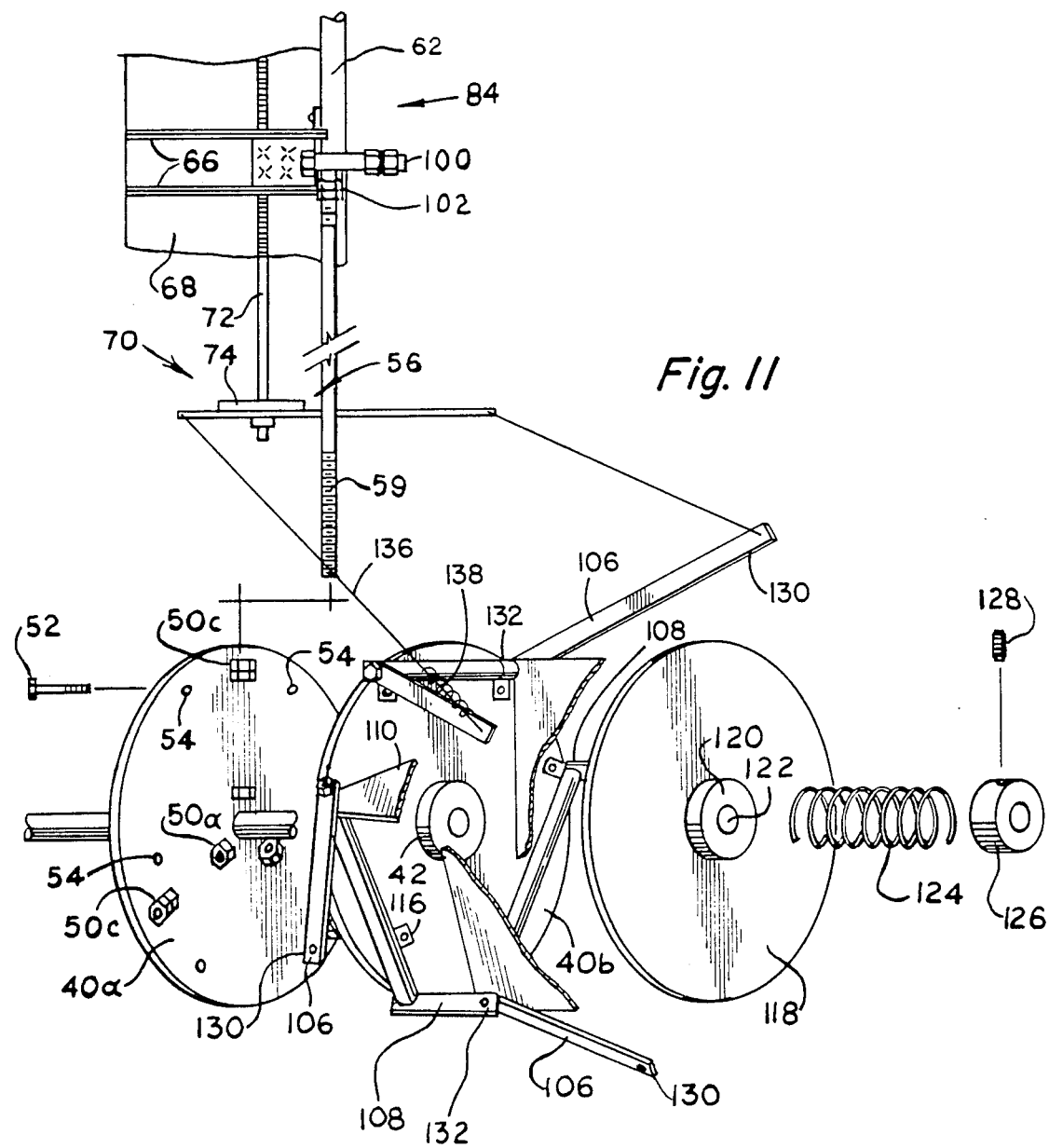
FIG. 11 is an exploded perspective view of the components of the turbine operably connecting it to the main shaft.

Referring, first, to FIG. 1, the wind turbine 20 of the present invention can be seen mounted on a support tower 22 and connected to a conventional generator 24 mounted on a platform 26 secured to the top end of the support tower. The platform 26 is rotatably mounted on the tower in a conventional manner for rotation about a vertical axis.

The wind turbine 20 includes a main shaft 28 which is operably connected to the generator 24 in a conventional manner through a coupling 30, and is rotatably supported by a pair of spaced bearing blocks 32, mounted upon and secured to the platform 26. The turbine further includes a mounting assembly 34 which is secured to the main shaft 28 for unitary rotation therewith, the mounting assembly serving to support three circumferentially spaced radially extending blades 36 in fixed angular relationship relative to each other, and a control system 38 operably interconnected with the mounting assembly 34 and the blades 36, for a purpose to be described later.

The mounting assembly 34 is best described by reference to FIGS. 1, 3, 9 and 11, wherein it can be seen to include a pair of circular discs 40a and 40b, each having a central hub 42 projecting outwardly and having an axial bore 44 therethrough, so that each disc can be mounted on the main shaft 28 of the turbine in a parallel spaced relationship. The hub 42 of each disc has a radially directed internally threaded hole 46 which receives a set screw 48 adapted to be advanced against the main shaft to fixedly secure the associated disc to the shaft for unitary rotation therewith. The discs 40a and 40b are maintained in parallel spaced relationship by a plurality of nuts 50a, 50b and 50c selectively welded to the inner surface of one of the discs in radial lines at 120° intervals. As will be appreciated by reference to FIG. 9, the most radially inward nuts 50a and the most radially outward nuts 50c are secured to disc 40a, while the nuts 50b at an intermediate location are secured to the opposite disc 40b, but when the discs are mounted on the main shaft, the nuts 50a, 50b and 50c are aligned to provide internally threaded passages adapted to support and retain an associated blade 36 in a manner to be described later. Accordingly, three such passages for supporting the three blades of the turbine are established by the nuts 50a, 50b and 50c, which also set the fixed parallel relationship between the discs 40a and 40b. To connect the discs, and for a purpose to be discussed later, six bolts 52 are passed through aligned openings 54 in the discs near their perimeter, as can best be seen in FIG. 11, so that the bolts 52 form a threaded interconnection between the discs, thereby holding them tightly against the nuts 50a, 50b and 50c that retain the desired spacing.

As will be appreciated by reference to FIGS. 1, 3, 4 and 11, each blade 36 of the turbine 20 includes a radially inward segment or support arm 56 and a radially outward segment or airfoil segment 58 which are pivotally interconnected, to allow the airfoil segment to fold straight downwind under wind velocities and/or rotational speeds that exceed a predetermined level.

The radially inward segment or support arm 56 of each blade consists of an elongated rod 59 of circular cross section having externally threaded inner and outer ends, with the inner end being threadedly received in one aligned set of the nuts 50a, 50b and 50c separating the discs of the mounting assembly. The airfoil segment 58 of each blade 36 forms an air impinging surface which cooperates with moving air to drive the turbine in a rotating fashion about the central longitudinal axis of the main shaft 28. To assist in this regard, and as best seen in FIGS. 2 and 10, a main body portion 60 of the airfoil segment 58 of each blade is of airfoil configuration similar to that found on airplane wings.

The main body 60 is composed of a tubular pipe 62 extending along the leading edge of the main body, which can be made of copper, having two spaced laterally extending wood strips 64 forming a substantially parallel extension from opposite sides of the tubular rod 62. The wood strips are secured to and support a plurality of perpendicular ribs 66 which in the preferred embodiment, are, also, made of wood and are bonded at one end to the tubular rod to form a lateral extension therefrom. These components form the skeletal body of the main body 60 so that a skin 68, such as of aluminum screen with fiberglass covering, can be wrapped therearound and bonded to the ribs, tubular pipe, and wood strips, forming the air impinging surface, or external covering, for the main body. The airfoil segment 58 of each blade includes a counterbalancing system 70 having an elongated blade shaft 72 extending longitudinally through the ribs 66 of the main body and protruding radially inwardly from the innermost end of the main body a distance approximating 15% to 20% the length of the main body. The innermost end of the blade shaft 72 has a weight 74 affixed thereto which could be in the form of a steel bar, with the positioning and weight of the bar 74 being designed so that the effective center of gravity ECG of the airfoil segment 58 of the blade upon rotation is positioned upwind from the pivotal connection to the support arm segment 56 of the blade, and in an approximate upwind or horizontal alignment therewith. The importance of the location of the effective center of gravity of the airfoil segment will be explained hereinafter with the operation of the turbine.

The threaded blade shaft 72 extends through aligned openings (not seen) provided in the ribs 66 of the main body of the airfoil segment of the blade, and is secured thereto by a threaded connection to nuts 78 that are welded to T-nuts 80 secured in a conventional manner in the respective ribs 66, as illustrated in FIG. 5. The blade shaft 72 is thereby securely connected to the ribs, and the ribs are bonded to the leading tubular rod 62 forming the leading edge of the main body 60, but, to make sure that the tubular rod along the leading edge is not released on high rotational speeds of the blades, due to centrifugal force, aluminum clips 82 are riveted to the rod 62, immediately inwardly of each rib 66. These clips 82, of course, prevent the tubular rod from sliding radially outwardly relative to the ribs, so that the rod is not released, forming a dangerous projectile.

A hinge bracket 84, which is best seen in FIGS. 4, 7, 8 and 11, forms the pivotal connection between the inner support arm segment 56 and the outer airfoil segment 58 of each blade 36. The hinge bracket 84 can be seen, in FIGS. 7 and 8, to include a parallel plate member 86 and a larger parallel plate member 88 which are secured together in parallel relationship by spacer bars 90, with a plurality of nuts 92 being welded to an outer side of the larger plate member 88 in axial alignment to threadedly receive the blade shaft 72, while a pivot shaft 94 is welded to the outer surface of the smaller plate 86, in a direction perpendicular to the blade shaft 72. The pivot shaft 94 consists of a bolt 96, the head of which is welded to the smaller plate 86, with the bolt 96 inserted into a sleeve 98 rotatably mounted thereon and secured in position by a pair of lock nuts 100 threaded onto the distal end of the bolt 96. The sleeve 98 itself has a pair of nuts 102 welded thereto to threadedly receive in perpendicular relationship to the pivot shaft the outer end of the support arm segment 56 of the associated blade 36, so that the airfoil segment 58 of each blade is free to pivot directly downwind about the pivot shaft 94 which is perpendicular to the support arm segment of the blade through the hinge bracket. The hinge bracket itself is secured between a pair of ribs 66 in the main body 60 of the blade, as best seen in FIG. 4, so that the pivot rod protrudes through an opening 104 left in the skin 68 of the main body. This allows the airfoil segment 58 to pivot about the blade shaft via the threaded interconnection between the blade shaft and the nuts 92, so that the blade can be feathered, or rotated about a longitudinal axis, under predetermined wind conditions and pursuant to the cooperation of the blade with the control system 38 to be described later.

It will be appreciated, from the foregoing description, that the main body portion 60 of each blade 36 is free to fold straight downwind by pivoting about the pivot shaft 94 of the hinge bracket 84, and is also free to rotate about its own blade shaft 72, which extends longitudinally of the blade, simultaneously with the folding or pivotal movement about the pivot shaft. The control system 38 has been designed to retain the main body portion 60 of the blade in a substantially radially oriented relationship with the main shaft 28 of the turbine, but yieldingly allow the main body 60 to fold straight downwind upon wind velocities in excess of predetermined levels which not only cause the blade to naturally fold downwind, but, also, simultaneously feather or rotate about its blade shaft 72, in a manner described hereafter.

The control system 38 can be seen, in FIGS. 2, 3, 6 and 11, to include a leading control arm 106, a shorter trailing control arm 108, and a cam arm 110, each fixedly secured, as by welding, to a control shaft 112 that is rotatably mounted in a sleeve 114 secured to the downwind side of the mounting disc 40b, as by a pair of brackets 116. As will be appreciated by reference to FIG. 11, the brackets 116 are secured to the disc 40b by the bolts 52 which serve to interconnect the discs 40a and 40b in the spaced relationship described previously. As probably best seen in FIG. 3, which shows the turbine oriented as it would be in very mild wind conditions, the trailing control arm 108 which is secured to one end of the control shaft 112 protrudes substantially downwind from its connection to the control shaft at a downward angle of approximately 30° relative to horizontal, while the leading control arm 106, which is secured to the opposite end of the control shaft, extends downwind, but at an upward angle of approximately 30° with respect to horizontal. The cam arm 110 is disposed immediately adjacent to the leading control arm 106 and consists of a plate extending perpendicularly to the control shaft. The cam arm 110 has a semicircular lower edge for a purpose to be described later. Of course, there is an identical trailing, leading and cam arm 108, 106, and 110 respectively associated with each blade 36 of the turbine and the cam arms 110 are disposed in abutting perpendicular relationship with a circular coordination or control plate 118 that is freely mounted on the main shaft 28 immediately adjacent to and downwind from the cam arms 110. The coordination plate 118 has a central hub 120 with an axial opening 122 therethrough, so that the plate 118 is concentrically mounted on the main shaft 28. A coil spring 124 circumscribes the main shaft 28 downwind from the coordination plate, and is positioned between the coordination plate and a collar 126 that is secured to the main shaft, as by a set screw 128. Accordingly, the coordination plate 118 is free to slide along the main shaft 28 in upwind/downwind directions, and does so upon application of pressure by a cam arm 110 against the plate 118, in a manner to be described later. However, it will be appreciated that the coil spring 124, in a nonrotating condition of the turbine, serves to retain the cam arms 110 in an abutting relationship with the disc 40b, as illustrated in FIG. 3, and, for reasons which will become apparent later, also yieldingly retains the blades in an unfolded condition.

The distal ends 130 and 132 of the leading and trailing control arms respectively have openings therethrough, so that cables 134 and 136 respectively can innerconnect the ends of these arms with opposite ends of the counterweight rod carried on the innermost end of the blade shaft. As will be appreciated, the counterweight rod 74 extends substantially perpendicularly to the length of the blade shaft 72, so as to form lateral extensions in opposite directions from the blade shaft. It will, thus, be appreciated that, by moving one cable more than the other in a substantially horizontal direction, the main body 60 of the associated blade can be made to feather or rotate about its blade shaft 72, and, as will be appreciated by the description of the operation of the turbine hereinafter, the control system 38 is adapted to perform that very function as the main body of the blade is folded downwind under high wind velocity conditions and high rotational speeds. A small coil spring 138 at the downwind end of the cable 136 is connected to the trailing control arm 108 and to the cable at a short distance along its length to provide for some slack in the cable along the length of the spring when the spring is not extended. The function of the small coil spring 138 will become apparent from the description of the operation of the turbine hereafter.

In the operation of the wind turbine 20, it will be appreciated that the rotatable connection of the platform 20 to the top of the tower 22 allows the entire wind turbine assemblage to rotate about a vertical axis of the tower, depending upon the direction of the wind, and due to the down wind nature of the wind turbine, the assemblage will always be oriented, so that the electrical generator 24 is disposed upwind from the turbine. The movement of air against the main body portion 60 of the blades 36, as illustrated in FIG. 2, will cause the turbine to begin rotating, due to the airfoil characteristics of the blades. The control cables associated with each blade serve to retain the blade in an angular orientation relative to its blade shaft 72, which allows the blades to turn under very mild wind conditions. However, as the wind velocity increases, and the main body of the blade is encouraged to fold downwind, the blade is allowed to pivot slightly about its blade shaft 72 by tensioning the small coil spring 138 in the trailing control arm connection, which places the main body portion of the blade in an angular orientation, which is optimal for intermediate velocity winds. By way of example, with no wind the blade might retain an orientation which is substantially radial but inclined slightly forwardly in what might be termed an upwind direction until the wind starts to blow and the wind velocities reach approximately 5-10 miles per hour, at which time a slight downward folding of the blade extends the small coil spring 138, allowing the blade to rotate slightly into an intermediate position which it would retain until wind velocities reached, for example, 20-30 mile per hour, at which point the main body portion of the blade will have a stronger tendency to fold downwind, due to the air pressure against the main body portion of the blade, and, also, due to the fact that the effective center of gravity ECG of the airfoil segment 58 of the blade on initial rotation of the blade is upwind from the hinged connection to the support arm 56, so that the airfoil segment is urged, by naturally occurring centrifugal forces, to rotate in a clockwise direction, as viewed in FIG. 3, about the pivot shaft 94 of the hinge bracket 84.

Of course, the downwind folding or the clockwise pivoting, as viewed in FIG. 3, is resisted by the biasing means or coil spring 124 mounted on the main shaft 28 through the control system 38. Clockwise pivotal movement of the airfoil segment 58 of the blade about the hinge bracket 84 connection causes a counterclockwise rotation of the control arms 106 and 108 about their pivotal mounting, but the counterclockwise rotation of the control arms is yieldingly resisted when the cam arms 110, along its lower semi-circular edge, abut the control plate 118, and the control plate is moved against the bias of the compression spring 124. However, as the wind velocity increases, the cam arms of the control system are urged with more force against the bias of the compression spring 124, allowing the blades 36 to fold downwind in direct response to the wind velocity and naturally occurring centrifugal forces effectively acting through the effective center of gravity of the blades. Of course, the resistance of the coil spring is predetermined, so as to allow the folding movement under certain preselected wind velocities.

As mentioned previously, the leading and trailing control arms 106 and 108 respectively of the control system 38 are disposed at different angles relative to the main shaft 28 of the turbine. The trailing control arm 108 in static condition angles downwardly from the main shaft at an angle of approximately 30°, while the leading control arm 106 forms an upward angle of approximately 30°. As will be appreciated by reference to FIG. 3, due to the different angular relationships of the control arms to the main shaft and the different lengths thereof, pivotal movement of the control arms about their pivotal mounting will allow the main body 60 portion of the associated blade 36 to rotate about its blade shaft 72, since the component of movement of the leading control arm 106 in a horizontal upwind direction parallel to the main shaft 28 is greater than the component movement of the trailing control arm 108 in that same direction, upon an equal angular movement of the two arms about their pivotal mounting. Accordingly the side of the counterbalance bar 74 which is connected to the leading control arm is allowed to move a greater distance than the side connected to the trailing control arm, thereby providing pivotal movement of the airfoil segment about its blade shaft 72, which effects a feathering of the blade. Furthermore, as will be appreciated by referring to FIG. 3 in the drawing, after the spring 138 has been tensioned allowing cable 136 to assume its full length, continued folding of the blade will cause the blade to feather rapidly initially and then to feather at a decreasing rate with continued folding of the blade. This occurs due to the initial starting angles of the control arms relative to horizontal.

As will be appreciated, the feathering or pitch change occurs simultaneously with the folding of the blade, so that before wind velocities and/or rotational speeds of the turbine are so high that they are likely to cause damage to the turbine system, the blades are folded downwind and feathered into a position where they do not induce as much rotational speed.

As mentioned previously, the rate that the blades fold and the rate that the blades feather are not identical, even though the blades are folding and feathering simultaneously. This characteristic of the turbine is best illustrated in FIGS. 12, 13 and 14a through 14d.

Figure 14A:
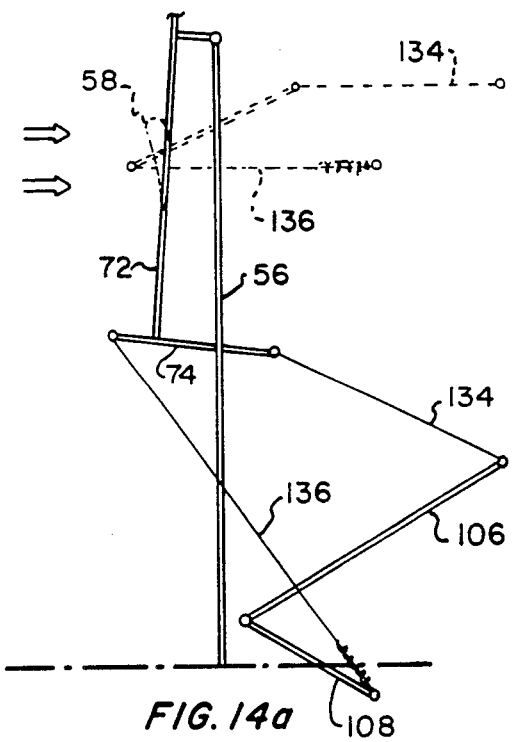
FIGS. 14a–14d are diagrammatic operational views of the control mechanism of a blade illustrating the relationship of fold and pitch at 20° intervals of rotation of the control arms. A dotted line representation of the blade and its control mechanism as seen looking vertically downward is overlaid to better illustrate the relationship of fold and pitch.
Figure 14B:
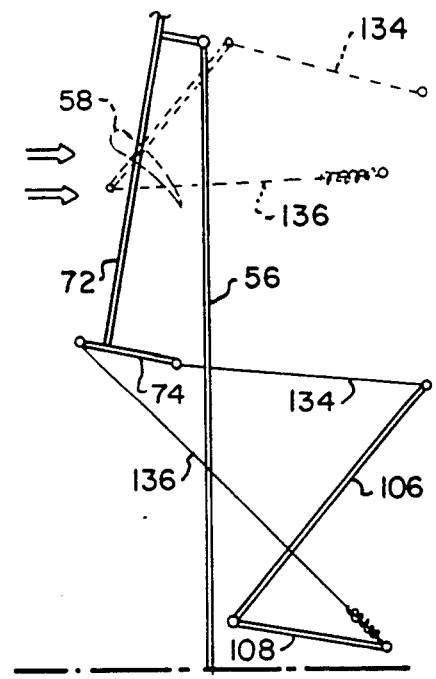
Figure 14C:
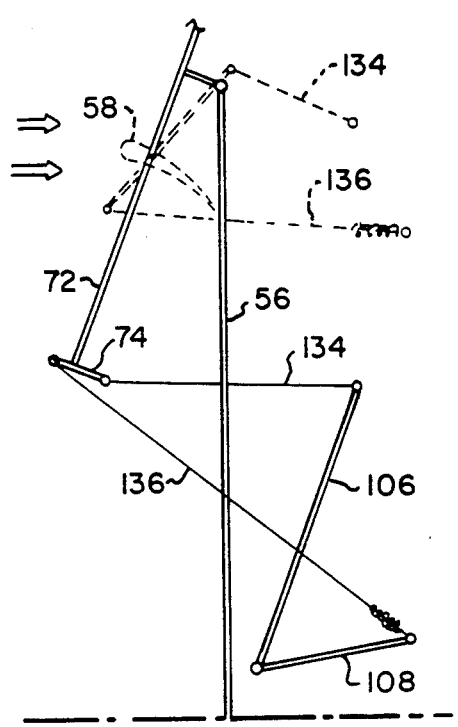
Figure 14D:
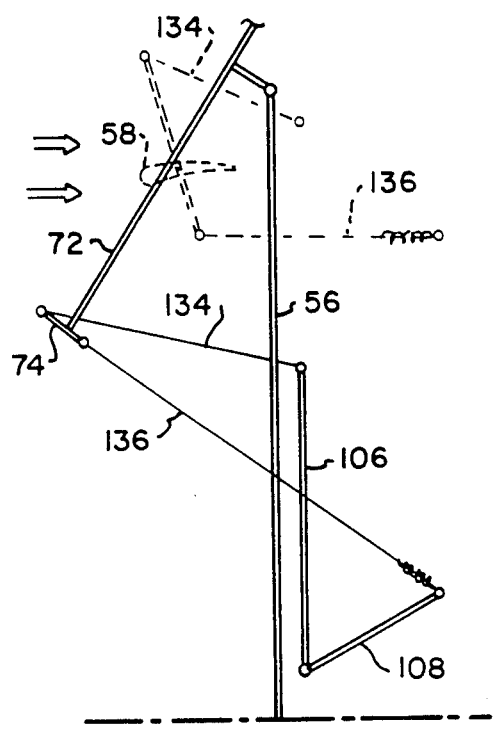

Looking first at the diagrammatic operational views shown in 14a through 14d, the movement of the control arms, the control cables, the blade shaft and the counterweight rod are illustrated in sequential positions with FIG. 14a showing the initial position and FIGS. 14b through 14d illustrating the respective positions of the various parts at 20° intervals of the control arms moving in a counterclockwise direction. The solid line representations in the Figures show the folding movement of the blade shaft as it relates to the control arms and control cables, and the dotted line representation illustrates the orientation of the blade as it would be seen looking downwardly in a vertical direction on the blade.

As can be appreciated in FIGS. 14a through 14d, the pitch of the blade changes radically initially with a very small angular movement of the control arms and blade shaft and consequently a small folding movement. Subsequently, with much larger wind speeds, for example, in excess of 40 miles per hour, the rates of folding relative to th rate of pitch change increases. In this manner, it has been found that optimum rotational speeds of the turbine can be obtained with small wind velocities, but in high wind conditions, a rapid folding of the blades out of the wind prevents rotational speeds which might cause rapid deterioration of the system. In other words, by providing an apparatus which has blades that fold and feather at various rates, even though simultaneously, the apparatus obtains two very desirable characteristics in that it can rotate at optimal speeds with light winds while maintaining a predetermined safe speed of rotation with high winds.

Figures 12, 13:
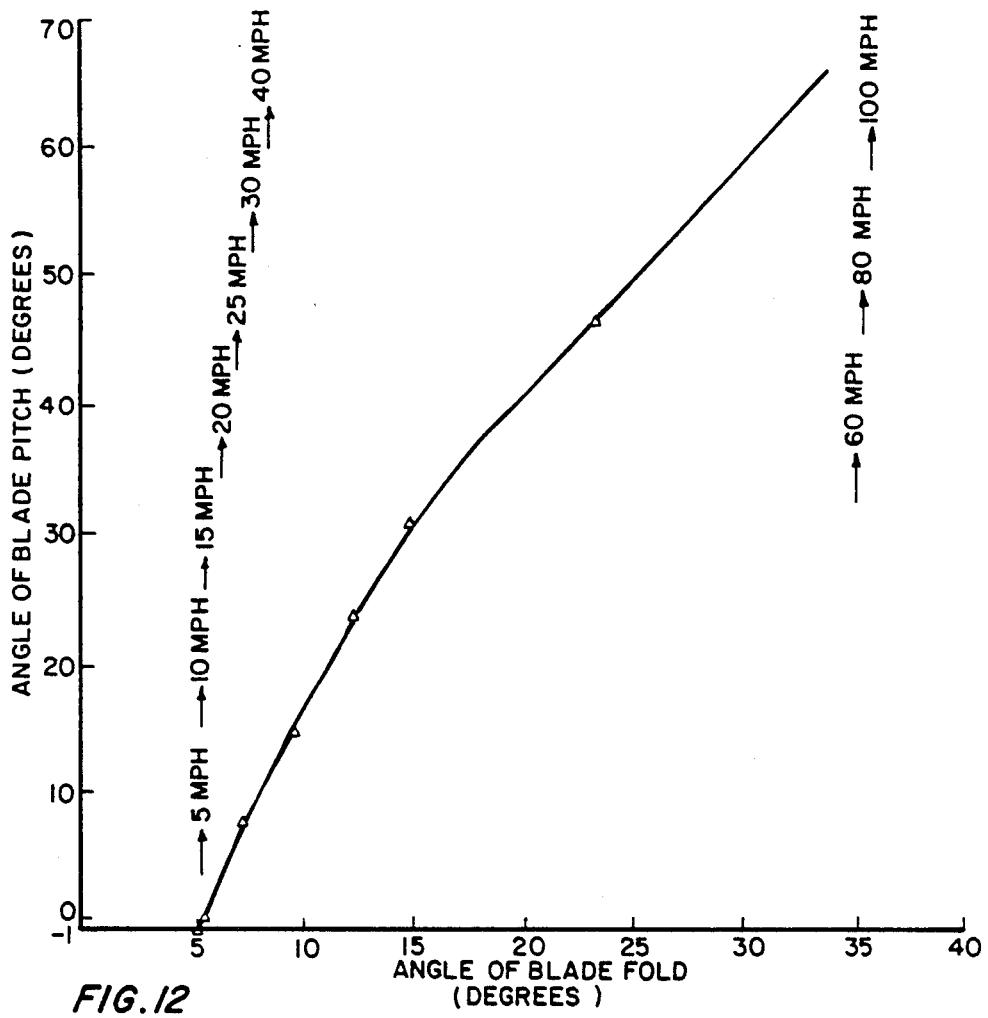
FIG. 12 is a graph illustrating the angle of fold vs. the angle of pitch of the blades.
FIG. 13 is a table relating wind velocity to the angles of the control arm, blade pitch and blade fold.

The relationship of wind velocity to the angle of the control arms, the folding angle of the blade, and the blade pitch for a preferred embodiment of the invention are illustrated in the graph of FIG. 12 and the chart of FIG. 13 wherein it can be clearly seen that the pitch of the blade changes radically with initial wind increases, while the fold of the blade is occurring at a relatively slower rate, but the folding rate increases relative to the pitch change as the wind speed reaches higher levels which are potentially damaging to the turbine. It is important to note in FIG. 12 that the scale for the angle of pitch, or vertical axis of the graph, is nearly double that of the scale of the horizontal axis for the angle of fold.

It can be seen in the graph that, for example, as the wind speed increases from 5 to approximately 30 miles per hour, the angle of pitch has changed nearly 9° while the angle of fold of the blade has only changed approximately 1.8°. It is also important to note that as the wind speed increases from 40 mile per hour to 60 mile per hour winds, the blades fold approximately 27.1°, whereas the blade had only folded a little over 2.8° with the wind speed increasing from 5 to 40 miles per hour.

These statistical characteristics of the wind turbine are more precisely illustrated in the chart of FIG. 13 where the wind velocity is related to the degree of tilt of the trailing control arm relative to horizontal, the degree of fold of the blade shaft relative to vertical, and the degree of blade pitch relative to a plane extending perpendicular to the direction of the wind.

Pursuant to the above description, it will be appreciated that the wind turbine 20 has been designed so that the airfoil segment 58 of a blade 36, which does not extend the full radial length of the blade, is mounted, so as to be foldable straight downwind and, also, pivotable about a longitudinal axis, to accomodate various wind conditions, thereby avoiding damage to the system due to high velocity winds and high rotational speeds which have previously been extremely detrimental to the survivability of wind turbines. It is important to note that because the blades fold directly or straight downwind, as opposed to prior art systems which fold off to the side as well as downwind, unusual stressing torques are not placed on the system which would detrimentally effect the life of the system. The turbine of the present invention, as has been mentioned previously, positions the main body portion 60 of the blades in a position to generate larger startup torque to start the turbine rotating, even with extremely mild air movement, then allows the blades to become positioned optimally, for intermediate wind conditions, before the blades are allowed to fold substantially and, simultaneously, feather under high wind conditions and rotating speeds which could be damaging to the turbine. In fact, as mentioned previously, the blades in a static condition are actually inclined slightly upwind from vertical allowing a desired pitch orientation of the blades to better receive initial wind currents. Further, and as mentioned previously, since the turbine is connected, in the disclosed embodiment, to an electric generator 24, the rotational movement of the main shaft 28 creates a similar rotational movement of the desired component within the generator, so that the generator is operative in generating electricity for any useful purpose.

It is important to appreciate that the blades will automatically fold, due to naturally occurring forces on the blades, i.e., direct wind contact on the blade and centrifugal force acting through the eccentrically positioned effective center of gravity. With the naturally encouraged folding and responsive control system, the simultaneous folding and feathering is accomplished with a relatively simple mechanisms, avoiding excessive costs and frequent breakdowns.

Although the present invention has been described with a certain degree of particularity, it is understood that the present disclosure has been made by way of example, and changes in detail or structure may be made without departing from the spirit of the invention, as defined in the appended claims.

What is claimed is:

1. A wind turbine device having a main rotatable driven shaft, a plurality of elongated blades operatively mounted on said main shaft for unitary rotation with the main shaft, said blade extending substantially radially away from said main shaft and adapted to fold downwind under naturally occurring forces and simultaneously feather in direct response to the folding movement, and means associated with the blades for increasing the rate of fold relative to the rate of feather as the speed of rotation increases.

2. The wind turbine of claim 1, wherein each blade is mounted for pivotal movement about a longitudinal axis of the blade, and includes hinge means intermediate its length to allow the portion of the blade lying radially outwardly from the hinge means to fold downwind.

3. The wind turbine of claim 2, further including biasing means adapted to yieldingly resist the downwind folding of a blade.

4. The wind turbine of claim 3, wherein the effective center of gravity of each blade is positioned so as to be upwind from said hinge means when said turbine is operating, whereby, upon rotation of said blade, the effective center of gravity will naturally be urged by centrifugal forces in an arcuate path around said hinge means to effect a folding of the blade.

5. The wind turbine of claim 4, wherein each blade has a rigidly mounted radially inward segment with said hinge means mounted near the outer end thereof, and a radially outward segment having a relatively broad transverse cross section to provide an air impact surface, said radially outward segment being connected to said hinge means at a location intermediate its length, and control means operably interconnecting said biasing means with the portion of said outward segment which is disposed radially inwardly of the hinge means.

6. The wind turbine of claim 5, wherein said control means includes means for effecting a pivotal movement of the radially outward segment of a blade about said longitudinal axis of the blade as the radially outward segment is pivoted about said hinge means.

7. The wind turbine device having a main rotatable driven shaft, a plurality of elongated blades operatively mounted on said main shaft for unitary rotation with the main shaft, said blades extending substantially radially away from said main shaft, and having means for enabling the blades to fold straight downwind under naturally occurring forces upon predetermined rotational speeds and simultaneously feather in direct response to the folding movement, each blade being mounted for pivotal movement about a longitudinal axis of the blade and including hinge means intermediate its length to allow the portion of the blade lying radially outwardly from the hinge means to fold downwind, biasing means adpated to yieldingly resist the downwind folding of a blade, each blade having a rigidly mounted radially inward segment with said hinge means mounted near the outer end thereof, and a radially outer segment having a relatively broad transverse cross section to provide an air impact surface, said radially outward segment being connected to said hinge means at a location intermediate its length, control means operably interconnecting said biasing means with the portion of said outward segment which is disposed radially inwardly of the hinge means, said control means including means for effecting a pivotal movement of the radially outward segement of a blade about said longitudinal axis of the blade as the radially outward segment is pivoted about said hinge means, said control means further including a pair of arms which are pivotally mounted about an axis extending transverely of the inward segment of the blade, a controlled bar mounted on the inward portion of the outward segment of the blade in a substantially perpendicular relationship with said longitudinal axis, and connecting means interconnecting each of said arms to an associated end of said control bar, whereby said outward segment of the blade is caused to pivot about its longitudinal axis as the outward segment is pivoted about said hinge means and wherein the center of gravity of each blade being positioned so as to be upwind from said hinge means when said turbine is operating, whereby, upon rotation of said blade, the effective center of gravity will naturally be urged by centrifugal forces in an arcuate path around said hinge means to effect a folding of the blade.

8. The wind turbine of claim 7, further including a third arm mounted for pivotal movement about said axis which extends transversely to the inward segment of the blade, said third arm being adapted to operatively bias said biasing means when said outward segment of the blade is pivoted downwind about said hinge means.

9. The wind turbine of claim 8, wherein said pair of arms and said third arm are fixedly mounted on a common rotatable shaft.

10. The wind turbine of claim 7, wherein each of said pair of arms forms a different angle relative to the radially inward segment of the associated blade.

11. The wind turbine of claim 7, wherein each of said pair of arms is a different length.

12. The wind turbine of claim 7, wherein said connection means between one of said pair of arms and said control bar includes a resilient portion.

13. The wind turbine of claim 7, wherein the radially outward segment of each blade includes radially and transversely extending inner reinforcement, a skin of material surrounding said reinforcement, and lock means interconnecting said longitudinal and radial reinforcement to prevent the longitudinal reinforcement from being released by centrifugal force.

14. The wind turbine of claim 5, wherein said radially outward segment of each blade includes radially and transversely extending inner reinforcement, a skin of material surrounding said reinforcement, and lock means interconnecting said longitudinal and radial reinforcement to prevent the longitudinal reinforcement from being released by centrifugal force.

15. The wind turbine of claim 4, wherein said effective center of gravity and said hinge means are in substantially horizontal alignment.

* * * * *